United States Patent [19]

Onoe et al.

[11] Patent Number: 4,763,925
[45] Date of Patent: Aug. 16, 1988

[54] AUTOMOBILE BODY PILLAR STRUCTURE HAVING A SAFETY BELT ANCHOR NUT PLATE

[75] Inventors: Yosiaki Onoe, Hiroshima; Tokio Mikasa, Kure, both of Japan

[73] Assignee: Mazda Motor Corporation, Hiroshima, Japan

[21] Appl. No.: 755,567

[22] Filed: Jul. 16, 1985

[30] Foreign Application Priority Data

Jul. 23, 1984 [JP] Japan .......................... 59-111562[U]

[51] Int. Cl.⁴ ...................... B60R 21/10; B62D 25/00
[52] U.S. Cl. ...................................... 280/808; 296/30
[58] Field of Search ................ 280/801, 808; 296/30; 411/172, 174, 175

[56] References Cited

U.S. PATENT DOCUMENTS 4,470,619  9/1984  Imajyo et al. ...................... 280/808

FOREIGN PATENT DOCUMENTS 56-138770  10/1981  Japan .
50643  2/1982  Japan .................................. 280/801

Primary Examiner—Ross Weaver
Attorney, Agent, or Firm—Fleit, Jacobson, Cohn & Price

[57] ABSTRACT

A pillar structure for automobile bodies including an outer panel having a front and rear connecting flanges, an inner panel having a front and rear connecting flanges which are respectively welded to the front and rear connecting flanges of the outer panel to form a structure of closed cross-section, an anchor nut plate having an anchor nut for installing an end of a safety belt and disposed in a space between the outer and inner panels. The outer panel is formed at a front portion with a stepped portion which is adapted to be covered by a side door of the automobile body. The anchor nut plate includes a rear end portion which is held between the rear connecting flanges of the outer and inner panels, a nut plate section located along the inner panel and carrying the anchor nut, a web extending with an angle with respect to the nut plate section to cover substantial part of the space between the outer and inner panels with a spacing with respect to the outer panel, and a locating flange formed at a front portion of the anchor nut plate for an abutting engagement with the stepped portion in the outer panel.

6 Claims, 2 Drawing Sheets

AUTOMOBILE BODY PILLAR STRUCTURE HAVING A SAFETY BELT ANCHOR NUT PLATE

BACKGROUND OF THE INVENTION

1. Field of the Invention

The present invention relates to a pillar structure for automobile bodies and more particularly to a pillar structure having an anchor nut plate for installing one end of a safety belt.

2. Description of Prior Art

In Japanese utility model application 55-24805, filed on Feb. 27, 1980 and disclosed for public inspection on Oct. 20, 1981 under the disclosure number 56-138770, there is disclosed a pillar structure comprising an inner panel and an outer panel which are welded together both at the front edges and the rear edges to form a structure of closed cross-section. Inside the pillar structure, there is provided an anchor nut plate which carries an anchor nut for installing a fitting at one of a safety belt. The anchor nut plate has a front edge portion held between and welded to the front edges of the inner and outer panels and extends along the inner surface of the inner panel. The anchor nut plate further extends laterally outward beyond the junction between the rear edges of the inner and outer panels and along the inner surface of the rear portion of the outer panel to terminate at an abutting flange which is adapted to be abutted to the inner surface of the laterally outer portion of the outer panel. Thus, the abutting flange functions as a locating member for the anchor nut plate.

The pillar structure is intended to have the anchor nut plate withstand the shock load which will be applied from the safety belt to the pillar structure under a car crash or any other accident. It should however be noted that the abutting flange which is in abutting contact with the inner surface of the laterally outer portion of the outer panel may possibly cause a deformation in the outer panel and disturb a good appearance of the pillar structure.

SUMMARY OF THE INVENTION

It is an object of the present invention to provide a pillar structure for automobile bodies having an anchor nut plate which does not have any adverse effect on the appearance of the pillar panels.

Another object of the present invention is to provide a pillar structure having an anchor nut plate with locating means which does not cause any deformations in the pillar panels in areas which are important for the appearance of the pillar structure.

According to the present invention, the above and other objects can be accomplished by a pillar structure for automobile bodies comprising an outer panel having a front and rear connecting flanges, an inner panel having a front and rear connecting flanges which are respectively connected with said front and rear connecting flanges of the outer panel to form a structure of closed cross-section, an anchor nut plate having an anchor nut for installing an end of a safety belt and disposed in a space between said outer and inner panels, said outer panel being formed at a front portion with a stepped portion which is adapted to be covered by a side door of the automobile body, said anchor nut plate including a rear end portion which is held between said rear connecting flanges of the outer and inner panels, a nut plate section located along said inner panel and carrying said anchor nut, web means extending with an angle with respect to said nut plate section to cover substantial part of said space between the outer and inner panels with a spacing with respect to said outer panel, and locating means formed at a front portion of said anchor nut plate for an abutting engagement with said stepped portion in the outer panel. The locating flange may be formed at an end of a leg section extending substantially perpendicularly to said nut plate section and may extend substantially parallelly with said stepped portion.

According to the structure described above, the locating flange is held in the abutting engagement with the stepped portion in the outer panel which is adapted to be covered by the side door. Therefore, any deformation of the outer panel which may be caused by the abutting engagement with the locating flange on the anchor nut plate does not have any adverse effect on the appearance of the pillar structure.

The above and other objects and features of the present invention will become apparent from the following descriptions of a preferred embodiment taking reference to the accompanying drawings.

DESCRIPTION OF THE PREFERRED EMBODIMENT

Figure 1:
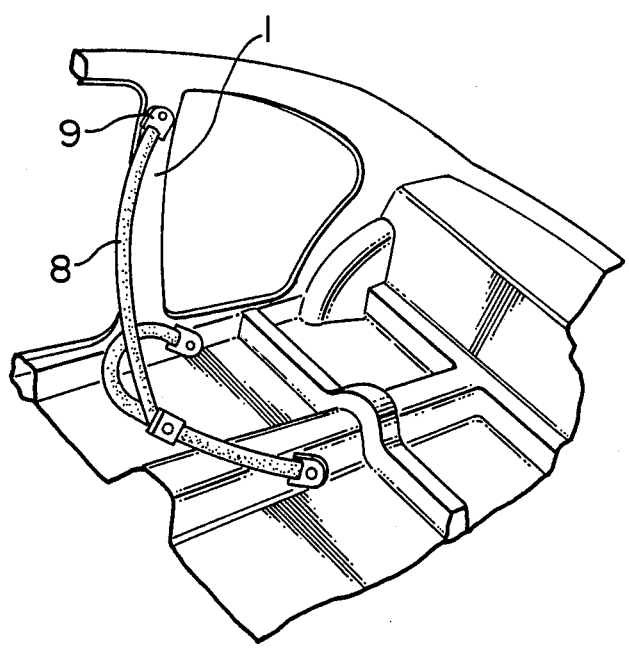
FIG. 1 is a perspective view of an automobile body structure showing a pillar structure and a safety belt installed at one end on the pillar structure.
Figure 2:
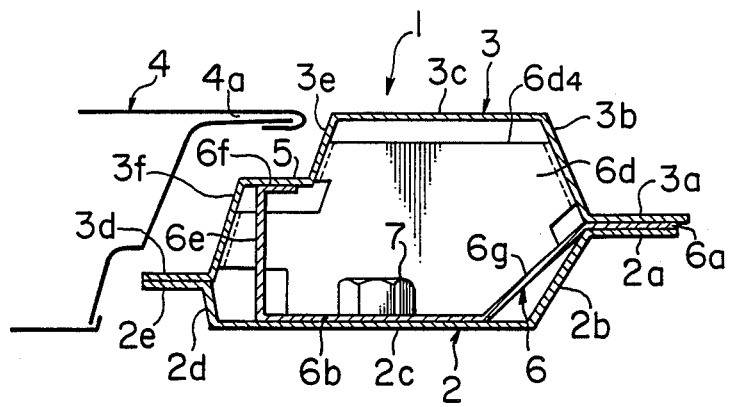
FIG. 2 is a cross-sectional view of the pillar structure.

Referring to FIG. 1, the vehicle body shown therein includes a pillar 1 to which a safety belt 8 is attached through a fitting 9. In FIG. 2, it will be noted that the pillar 1 comprises an inner panel 2 and an outer panel 3 which are connected together to form a structure of closed cross-section. The inner panel 2 includes a rear connecting flange 2a which continues at the front edge to an inwardly inclined rear section 2b which is turn continues to a substantially flat main section 2c. The main section 2c has a front end contiguous to an inclined front section 2d which continues to a front connecting flange 2e. The outer panel 3 has a rear connecting flange 3a which is adapted to be connected with the rear connecting flange 2a of the inner panel 2. The rear connecting flange 3a is contiguous with an outwardly inclined rear section 3b which continues to a substantially flat main section 3c. The outer panel 3 further has a front connecting flange 3d which is adapted to be connected with the connecting flange 2e of the inner pillar 2. Between the main section 3c and the front connecting flange 3d, there is a substantially flat stepped portion 5 which is substantially parallel with the main section 3c and connected with the main section 3c through a first inclined front section 3e and with the front connecting flange 3d through a second inclined front section 3f. As shown diagrammatically in FIG. 2, the stepped portion 3e is covered by the rear edge portion 4a of a side door 4 when the door 4 is in the closed position.

Figure 3:
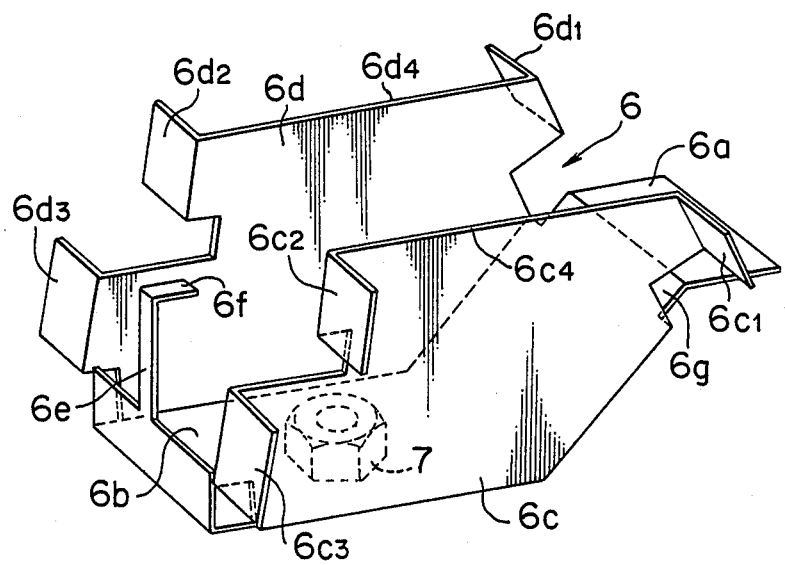
FIG. 3 is a perspective view of the anchor nut plate in accordance with one embodiment of the present invention.

In the pillar 1, there is disposed an anchor nut plate 6 for installing an anchor nut 7 for attaching the fitting 9 to the rear pillar 1 and reinforcing the rear pillar 1 at the area where the safety belt 8 is attached. The anchor nut plate 6 is made of a sheet metal and includes a rear connecting flange 6a which is adapted to be held between and connected by welding to the rear connecting flanges 2a and 3a of the inner and outer pillars 2a and 3a, respectively. The rear connecting flange 6a continues to a substantially flat nut plate section 6b through an inwardly inclined rear section 6g. The aforementioned anchor nut 7 is mounted on the nut plate section 6b. As shown in FIG. 3, the nut plate section 6b is contiguous at the upper edge with an upper web 6c and at the lower edge with a lower web 6d. The webs 6c and 6d extend substantially perpendicularly to the anchor nut section 6b.

It will be noted in FIG. 3 that the upper web 6c has a rear locating flange 6c1 adapted to be engaged with the rear section 3b of the outer panel 3. Further, at the front portion, the upper web 6c is formed with a first front locating flange 6c2 and a second front locating flange 6c3 which are adapted to be engaged with the first and second front sections 3e and 3f, respectively. Similarly, the lower web 6d has a rear locating flange 6d1 for engagement with the rear section 3b of the rear pillar 3 and a first and second front locating flanges 6d2 and 6d3 for engagement with the first and second front sections 3e and 3f, respectively. At the front end, the nut plate section 6b continues to a locating leg 6e which extends substantially perpendicularly to the nut plate section 6b and has a locating flange 6f at the end thereof. The locating flange 6f is adapted to be engaged with the stepped portion 5 of the outer panel 3. As shown in FIG. 2, the anchor nut section 6b is laid along the main section 2c of the inner panel 2.

In assembling the pillar 1, the anchor nut plate 6 is at first attached to the inner panel 2 by connecting the nut plate section 6b to the main section 2c through spot weldings. Then, the inner panel 2 is located with respect to the outer panel 3 and connected thereto through spot weldings at the rear connecting flanges 2a and 3a and the front connecting flanges 2e and 3d. In this instance, the inner panel 2 and the anchor nut plate 6 can be accurately located by bringing the locating flanges 6c1, 6c2, 6c3, 6d1, 6d2, 6d3 and 6f into engagement with cooperating sections. Particularly, the flanges 6c1, 6c2 and 6c3 engaged with the sections 3b, 3e and 3f, respectively, and the flanges 6d1, 6d2 and 6d3 engaged also with the sections 3b, 3e and 3f function to determine the fore-and-aft location of the inner panel 2, and the flange 6f engaged with the stepped portion 5 determines the transverse location of the main section 2c of the inner panel 2. In the assembled position, the outer edges 6c4 and 6d4 of the webs 6c and 6d are spaced from the main section 3c of the outer panel 3. The locating flanges 6c1, 6c2, 6c3, 6d1, 6d2, 6d3 are connected to the outer panel 3 by means of spot welding. For the purpose, access holes may be formed in the inner panel 2. The outer panel 3 may be deformed at the stepped portion 5 by being depressed by the locating flange 6f. However, since the stepped portion 5 is covered by the rear edge portion 4a of the side door 4, such deformation will have no adverse effect on the appearance of the pillar 1.

The invention has thus been shown and described with reference to a specific embodiment, however, it should be noted that the invention is in no way limited to the details of the illustrated structures but changes and modifications may be made without departing from the scope of the appended claims.

We claim:

1. A pillar structure for automobile bodies comprising:
   an outer panel having a front connecting flange and a rear connecting flange,
   an inner panel having a front connecting flange and a rear connecting flange,
   said front connecting flange of said inner panel being laid directly over said front connecting flange of said outer panel and connected thereto, said rear connecting flange of said inner panel being connected with said rear connecting flange of said outer panel to form a structure of closed cross-section,
   an anchor nut plate having an anchor nut for installing an end of a safety belt being disposed in a space between said outer and inner panels, said anchor nut plate being provided at front and rear portions with means for locating the anchor nut plate in a fore and aft direction with respect to said outer panel, said outer panel being formed at a front portion with a stepped portion which is adapted to be covered by a side door of the automobile body, said outer panel having a main section contiguous with said stepped portion through a front inclined portion and contiguous with said rear connecting flange of said outer panel through a rear inclined portion, said anchor nut plate including a rear end portion which is held between said rear connecting flanges of said outer and inner panels,
   a nut plate section located along said inner panel and carrying said anchor nut,
   web means extending at an angle with respect to said nut plate section to cover a substantial part of said space between said outer and inner panels and terminating at a spacing from said main section of said outer panel,
   locating means formed at a front portion of said anchor nut plate for a direct abutting engagement with said stepped portion of said outer panel for locating said anchor nut plate in a transverse direction of the automobile body, and
   front and rear locating flanges of said anchor nut plate connected respectively with said front and rear inclined portions of said outer panel.

2. A pillar structure in accordance with claim 1 in which said locating means includes leg means extending substantially perpendicularly to said nut plate section having an end formed with transversely locating flange means extending substantially parallel to said nut plate section and engaged with said stepped portion of the outer panel.

3. A pillar structure in accordance with claim 1 in which said inner panel includes a main section for engaging with said nut plate section and a rear section extending between said rear connecting flange and said main section, said rear section being contiguous with said rear connecting flange through a bend, said anchor nut plate having a rear section extending between said rear end portion and said nut plate section and being contiguous with said rear end section through a bend, said anchor nut plate being located with said bend thereof laid on the bend of the inner panel.

4. A pillar structure in accordance with claim 3 in which said main section of the inner panel is welded to said nut plate section.

5. A pillar structure in accordance with claim 3 in which said stepped portion of the outer panel is substantially parallel with said main section of the inner panel, said locating means including leg means extending substantially perpendicularly to said nut plate section having an end formed with transversely locating flange means extending substantially parallel to said nut plate section and engaged with said stepped portion of the outer panel.

6. A pillar structure in accordance with claim 1, wherein said anchor nut plate has an upper edge portion integral with an upper web extending substantially perpendicularly to the anchor nut plate and a lower edge portion integral with a lower web extending substantially perpendicularly to the anchor nut plate.

* * * * *